United States Patent Office 2,879,136
Patented Mar. 24, 1959

2,879,136

PROCESS OF PRODUCING HIGH BULKING FINELY DIVIDED SILICA

William T. Maloney, Clinton, N.Y.; Mabel Maloney, executrix of said William T. Maloney, deceased No Drawing. Application October 22, 1954
Serial No. 464,163

2 Claims. (Cl. 23—182)

The present invention relates to a process of producing a finely divided high bulking silica product useful as a filler in rubber mixes and for various other industrial purposes. More particularly the invention relates to a process involving the conversion of an appropriately selected fraction of a kaolin type clay by the chemical treatment and procedural steps hereinafter described into economically useful products, one being the novel high bulking silica product and the other being aluminum sulfate.

Many process have been proposed and a number of precipitated silica and generally similar silicon-containing products have been developed in recent years for use as substitutes for carbon black as fillers in rubber mixes, as ingredients of paint mixes, as filter aids and for various other purposes. However, such products as have been found suitable and to attain commercial importance for the above purposes have for the most part been relatively expensive. In many cases the products produced have also failed to meet the specifications as to fineness or color or some other desired quality.

It was known that the silica component of clays could be separated in the form of more or less finely divided particles of silica, sometimes referred to as precipitated silica, by treatments with sulfuric acid and other strong acids, but I do not find that the products produced by using sulfuric acid and following the teachings of the prior art have sufficiently satisfactory properties as regards particle size, bulking properties and color to meet the rather exacting requirements of the rubber industry.

For example, according to one prior procedure it is proposed to subject a clay of any of various types to a preliminary calcination to drive off all water of crystallization followed by treatment with sulfuric acid to convert the alumina component to aluminum sulfate and to recover a silica residue. I have found that the product obtained in this prior treatment is characterized by a relatively low bulking figure, showing an apparent density of upwards of 50 to 55 pounds a cubic foot and usually exhibiting more or less discoloration due no doubt to the presence of iron and other metallic impurities that have been converted into colored salts during the calcination treatment. Even when a carefully selected finer fraction of a kaolin type clay is treated in a process involving preliminary calcination, I have found that the problem of color is present and that the bulking figure is usually upwards of 15 pounds per cubic foot.

I have found that it is possible to obtain products that are entirely satisfactory from the color standpoint and which have a very considerably reduced apparent density, and hence higher bulking value, provided a clay of the kaolin type is appropriately selected as to fineness and degree of washing, with or without bleaching, to remove iron and similar impurities and then is subjected to direct treatment, without any preliminary calcination, with sulfuric acid under appropriate conditions as to the amount and dilution of the acid, the temperature and the extent of the mixing of the acid with the clay so as to insure a practically complete conversion of the alumina content of the clay to aluminum sulfate and then is subjected to a controlled evaporation and drying or calcining treatment sufficient to bring about at least partial dehydration of any silicic acid formed in the process. The resulting partially dehydrated mixture is thereafter remixed with sufficient water to dissolve the aluminum sulfate and filtered and washed to remove such aluminum sulfate, whereupon the silica residue may be dried and then is ready for use either with or without further subdivision by grinding or other comminution treatment.

The acid treatment may be conducted in several ways and the conversion of the alumina to aluminum sulfate may be brought about in a single acid treatment or may be in part effected in an initial treatment of the clay and finished at a later stage in the process. It appears to be an important feature of the process that the clay after the initial digestion or reaction with dilute sulfuric acid is heated to a calcining temperature and kept at such temperature long enough to insure that all or a greater part of the silicic formed as a result of the acid treatment has become dehydrated.

I have further found that it is desirable to effect the dehydration of the silicic acid which is formed in the initial step of heating and digesting with dilute sulfuric acid by heating the silicic acid in the presence of concentrated sulfuric acid. This may be done in several ways.

According to one modification, the suitably selected fine clay fraction is first digested with dilute sulfuric acid in an amount sufficient to provide an amount of sulfate ion equivalent to the proportion of the alumina present. A hydrous aluminum silicate clay of the kaolin type usually contains around 38% of alumina and the proportion of sulfuric acid will be selected accordingly. The reaction of the sulfuric acid with the clay is accelerated by heating. Preferably the temperature should be maintained close to but below the boiling point of the acid and sufficient pressure should be maintained to prevent evaporation of the water with result concentration of the acid until at least the greater part of the alumina has been converted to alumin sulfate.

In one example using 50 Bé. sulfuric acid which boils at about 295° F., the heating and mixing was carried on at a temperature of about 240° F. in a vessel closed to the atmosphere. The heating was continued with stirring for about 24 hours, whereupon the pressure in the reaction vessel was lowered to atmospheric with a continuation of the heating until all of the free water had been evaporated. The resulting reaction mixture was then mixed with a limited amount of water, sufficient, however, to dissolve the aluminum sulfate present. The resultant slurry was then filtered and washed in a filter press to remove the water-soluble aluminum sulfate. The silica residue was then dried and thereafter mixed with concentrated sulfuric acid. This mixture was then heated at about 320–360° F. for several hours. In the course of this treatment any unreacted alumina present in the mixture is converted to aluminum sulfate. The concentrated sulfuric acid also acts as a dehydrating agent on the silica and any silicic acid present. The silicic acid present at this stage will be largely produced as a result of conversion of residual alumina to aluminum sulfate and possibly to some extent will have been formed as a result of partial rehydration of the silica in the previous filtering and washing steps. When it was apparent that all free water of hydration of the alum and the silica (at this stage in the form of silicic acid) had been removed, the mixture was then dumped into cold water, then filtered and washed on the filter to remove the aluminum sulfate. The silica product was then dried.

In tests using a 40% cut as the final fraction from a classification treatment of a Georgia water washed kaolin clay known in the trade as "Georgia Kaolin clay #7," the silica product obtained showed bulking figures of around 2.8 to 3.0 lbs. per cubic foot. The silica product except for a minor proportion of coarser particles which were screened out before determining the bulking figure was of a fineness such that all particles passed through a 200 mesh sieve.

According to another modification a similar finer fraction from a classification of a Georgia Kaolin #7 clay was mixed with a considerable excess of dilute sulfuric acid. In this case the dilute acid was made up for the process by adding three parts of water to one part of 93% acid. The digestion treatment of the mixture was carried on for 24 hours with stirring and at a temperature of about 250° F. with sufficient pressure maintained during this period to prevent any considerable evaporation. Thereafter the pressure was reduced to atmospheric and heating was continued and the temperature increased until the water had been evaporated and practically all of the silicic acid present had undergone dehydration in the presence of the excess sulfuric acid, which became progressively more concentrated as the heating continued. When the mixture had been brought to the consistency of a sirup and no more water vapors were being boiled off, the residue was dumped into cold water and then filtered and washed on a filter to remove the aluminum sulfate. The temperature during the evaporation and subsequent dehydration stage was gradually raised to about 400° F. The silica residue from this treatment showed similar bulking properties and fineness as in the case of the preceding example.

By classifying the clay and using only a finer fraction thereof I am able to more closely control the particle size of the silica product. The particle size also has some relation to the bulking figure but the bulking figure does not vary directly according to the particle size. I have found that even when the classification of the fine kaolin clay has been conducted so as to obtain a considerably larger cut, say a yield of 75% in the finer fraction, I have still been able to obtain silica products having a bulking figure in the range 3 to 5 pounds per cubic foot.

Air floated clays may likewise be used but in either case, with air floated or the water-washed clays, better results are obtained when the clay has been fractionated to separate out the coarser particles according to the known classification procedure. I prefer to use the finer classified fraction of either a water washed or an air floated kaolin clay which constitutes not more than 75% of the total weight of the clay subjected to the classification treatment.

It will be understood that various changes in the details of the procedure may be made without departing from the invention which is not to be deemed as limited otherwise than as indicated by the scope of the appended claims.

I claim:

1. Process of treating a kaolin type clay to convert the silica content thereof to a finely divided high bulking product with simultaneous production and recovery of aluminum sulfate, which comprises digesting an uncalcined fraction of a Georgia type water-washed kaolin clay, said fraction being the finer cut constituting not more than 75% of the total, with an excess of dilute sulfuric acid and thereby converting at least the greater part of the alumina content thereof to aluminum sulfate, heating to evaporate the water liberated in the digesting reactions and to remove at least a large part of the water of hydration of the reaction products, thereafter filtering and washing to remove the aluminum sulfate, then treating the silica residue with concentrated sulfuric acid, evaporating the resulting mixture with heat to dryness and thereafter washing and filtering to recover the silica product free from aluminum sulfate.

2. Process of treating a kaolin type clay to convert the silica content thereof to a finely divided high bulking product with simultaneous production and recovery of aluminum sulfate, which comprises digesting a fine classified uncalcined fraction of a kaolin type clay with dilute sulfuric acid and thereby converting at least the greater part of the alumina content thereof to aluminum sulfate, heating to remove at least a large part of the water of hydration of the silicic acid and aluminum sulfate products of said acid treatment, thereafter filtering with addition of sufficient water to remove the aluminum sulfate, then treating the silica residue with concentrated sulfuric acid in sufficient amount to react with any remaining alumina, then heating the reaction mixture to drive off all free water and remaining water of hydration present therein, washing and filtering to remove sulfated aluminum products, and thereafter drying the silica residue.

References Cited in the file of this patent
UNITED STATES PATENTS

| | | |
|---|---|---|
| 752,927 | Schwahn | Feb. 23, 1904 |
| 1,752,641 | Kjellgren | Apr. 1, 1930 |
| 1,932,832 | Turrentine | Oct. 31, 1933 |
| 1,953,144 | Wilson | Apr. 3, 1934 |
| 2,476,979 | Hoeman | July 26, 1949 |